(12) United States Patent
Eveley

(10) Patent No.: US 8,678,407 B2
(45) Date of Patent: Mar. 25, 2014

(54) TRAILING BEAM FOR SUPPORTING AN AXLE

(71) Applicant: Nicholas Eveley, Stoney Creek (CA)

(72) Inventor: Nicholas Eveley, Stoney Creek (CA)

( * ) Notice: Subject to any disclaimer, the term of this patent is extended or adjusted under 35 U.S.C. 154(b) by 0 days.

(21) Appl. No.: 13/750,165

(22) Filed: Jan. 25, 2013

(65) Prior Publication Data
US 2013/0200588 A1     Aug. 8, 2013

Related U.S. Application Data

(60) Provisional application No. 61/591,017, filed on Jan. 26, 2012.

(51) Int. Cl.
*B60G 9/02*     (2006.01)

(52) U.S. Cl.
USPC ......... 280/124.116; 280/124.11; 280/124.128

(58) Field of Classification Search
USPC ........ 280/124.116, 124.128, 124.153, 124.11
See application file for complete search history.

(56) References Cited

U.S. PATENT DOCUMENTS

| | | | | |
|---|---|---|---|---|
| 5,366,237 | A * | 11/1994 | Dilling et al. ........... | 280/124.116 |
| 6,241,266 | B1 * | 6/2001 | Smith et al. ............ | 280/124.116 |
| 6,491,314 | B2 * | 12/2002 | Smith et al. ............ | 280/124.116 |
| 6,508,482 | B2 * | 1/2003 | Pierce et al. ........... | 280/124.116 |
| 6,672,604 | B2 * | 1/2004 | Eveley .................... | 280/124.128 |
| 6,827,360 | B2 * | 12/2004 | Chan et al. ............. | 280/124.116 |
| 7,048,288 | B2 * | 5/2006 | Chan et al. ............. | 280/124.116 |
| 7,178,816 | B2 * | 2/2007 | Chan et al. ............. | 280/124.116 |
| 7,360,774 | B2 * | 4/2008 | Saieg et al. ............ | 280/124.128 |
| 7,484,744 | B2 * | 2/2009 | Galazin et al. ......... | 280/124.116 |
| 7,669,866 | B2 * | 3/2010 | Peaker et al. .......... | 280/124.128 |
| 7,717,442 | B2 * | 5/2010 | Chalin .................... | 280/124.116 |
| 7,726,673 | B2 * | 6/2010 | Saieg et al. ............ | 280/124.128 |
| 7,731,211 | B2 * | 6/2010 | Ramsey ................. | 280/124.131 |
| 7,740,255 | B2 * | 6/2010 | Holt ........................ | 280/124.128 |
| 8,002,297 | B2 * | 8/2011 | Keiserman ............. | 280/124.116 |
| 8,006,987 | B2 * | 8/2011 | Saieg et al. ............ | 280/124.116 |
| 8,029,008 | B2 * | 10/2011 | Cortez et al. .......... | 280/124.175 |
| 8,333,396 | B2 * | 12/2012 | Saieg et al. ............ | 280/124.128 |
| 2006/0113741 | A1 * | 6/2006 | Chalin .................... | 280/124.116 |
| 2007/0145704 | A1 * | 6/2007 | Chan et al. ............. | 280/124.116 |
| 2007/0262551 | A1 * | 11/2007 | Hughes .................. | 280/124.128 |
| 2009/0072505 | A1 * | 3/2009 | McGinnis ............... | 280/124.116 |

\* cited by examiner

*Primary Examiner* — Nicole Verley
(74) *Attorney, Agent, or Firm* — Harness, Dickey & Pierce, P.L.C.

(57) ABSTRACT

The present invention provides a trailing beam for supporting a trailer axle. The trailing beam has a generally rectangular cross section, the top, bottom and sides of which are fabricated from steel plate or channels, with the individual components being welded together at their junctures. The trailing beam incorporates a novel axle wrap which provides a curved sided window enabling weld securement of the axle wrap to the axle without the weld extending parallel to a longitudinal axis of the axle.

4 Claims, 5 Drawing Sheets

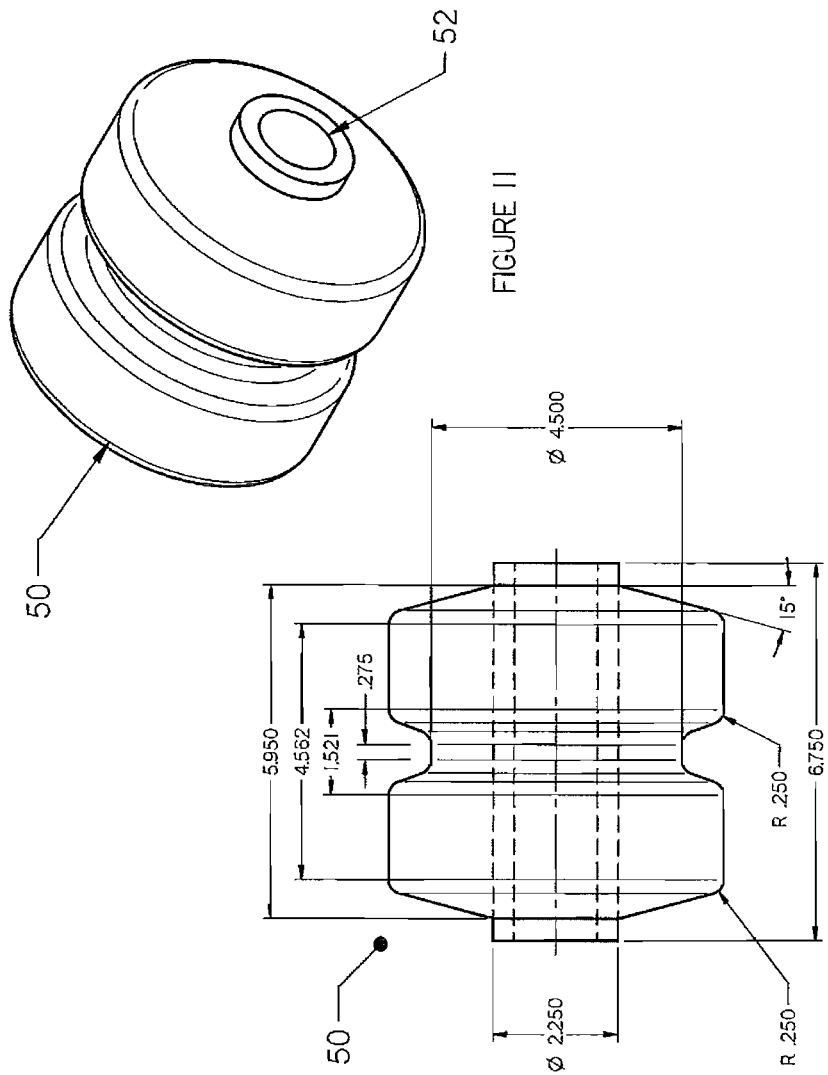

TRAILING BEAM FOR SUPPORTING AN AXLE

CROSS-REFERENCE TO RELATED APPLICATION

This application claims priority to U.S. Provisional Patent Application No. 61/591,017 filed Jan. 26, 2012 which is hereby expressly incorporated by reference.

FIELD OF THE INVENTION

The present invention relates generally to vehicle suspension assemblies. More particularly the invention relates to the trailing beam configuration for supporting an axle.

BACKGROUND OF THE INVENTION

A trailing beam suspension typically utilizes a beam having a leading end opposite a trailing end. The beam is mounted lengthwise to a hanger at its leading end for swinging movement about an axis transverse to a trailer. The hanger is typically secured to a chassis or frame of the trailer by suitable means such as welding. A suspension unit such as an air bag extends between the trailing end of the beam and the chassis of the trailer. An axle is mounted to the beam transverse to the beam between the leading and trailing ends of the beam.

The above suspension arrangement is referred to as a "trailing beam" suspension because the beam extends rearwardly from its connection to the hanger and accordingly, the axle "trails" the pivot point of the suspension system.

It is an object of the present invention to provide a suspension arrangement that shifts the typical load bearing from 80% bearing air spring/20% pivot connection to 60% air spring/40% pivot connection, providing a much smoother ride for fragile loads and keeping it versatile to still allow the 80/20 rigid arrangement for standard loads.

SUMMARY OF THE INVENTION

The present invention provides a trailing beam for supporting a trailer axle for both top and low mount suspensions. The trailing beam has a generally rectangular cross section, the top, bottom and sides of which are fabricated from steel plate or channels, with the individual components being welded together at their junctures. The trailing beam incorporates a novel axle wrap which provides a curved sided window enabling weld securement of the axle wrap to the axle without the weld extending parallel to a longitudinal axis of the axle.

A trailing beam for supporting an axle having an inverted channel shaped forward member extending longitudinally between and transverse to a tubular leading end which receives a pivot mounting bushing retainer, secured by welding, the axle having an axle axis parallel to a mounting axis of the leading end. The pivot mounting bushing retainer houses a pivot bushing with a center core steel sleeve. A trailing end extends longitudinally from the forward member transverse to the axle axis. The trailing end has a top and opposite side plates welded along adjacent edges. The top plate terminates in a pad for abutting against a resilient suspension member. The forward member and trailing end are welded one to the other at a juncture above and below the axle. A bottom plate extends from the leading end along the length of the forward member and side plates and is welded to respective lower edges thereof. An axle wrap comprising a pair of semi-tubular members is provided for encircling the axle.

The pivot bushing is a solid, elastometric material with a center core steel sleeve. The heavy wall allows for a bigger footprint for clamping (torquing). This creates a more secure pivot connection designed for roll stability for tractor trailers. The bushing is installed into the outer bushing sleeve which is the forward part of the trailing beam.

The trailing beam may have gusset plates welded to the forward member and the trailing end at their juncture to reinforce the trailing beam at the junction.

An axle wrap is provided for the trailer axle. The axle wrap comprises a semi-tubular member for encircling the axle. The member has opposite ends with opposite side edges extending therebetween. A curved sided indentation extends into the opposite side edges to provide a window for weld securement of the axle wrap to the axle without the weld extending parallel to a longitudinal axis of the axle. The axle wrap typically has 1½" of straight weld on the left and right sides of the wrap which helps to provide a more secure weld and is designed to compress the wrap to the axle. It has a bigger footprint for welding and allows a greater percentage of the weld across the grain in the neutral section of the axle. The axle wraps are welded to each other along their side edges beyond the indentation. The opposite ends of the axle wraps are welded about respective recesses in the forward member and the side plates which receive the axle.

DESCRIPTION OF DRAWINGS

These and other features of the invention will become more apparent from the following description in which reference is made to the appended drawings wherein:

FIG. 11 is a perspective view of a pivot bushing;

FIG. 12 is a front elevation of the bushing of FIG. 11;

FIG. 13 is an end elevation of the bushing of FIG. 11.

DESCRIPTION OF PREFERRED EMBODIMENTS

Figure 1:
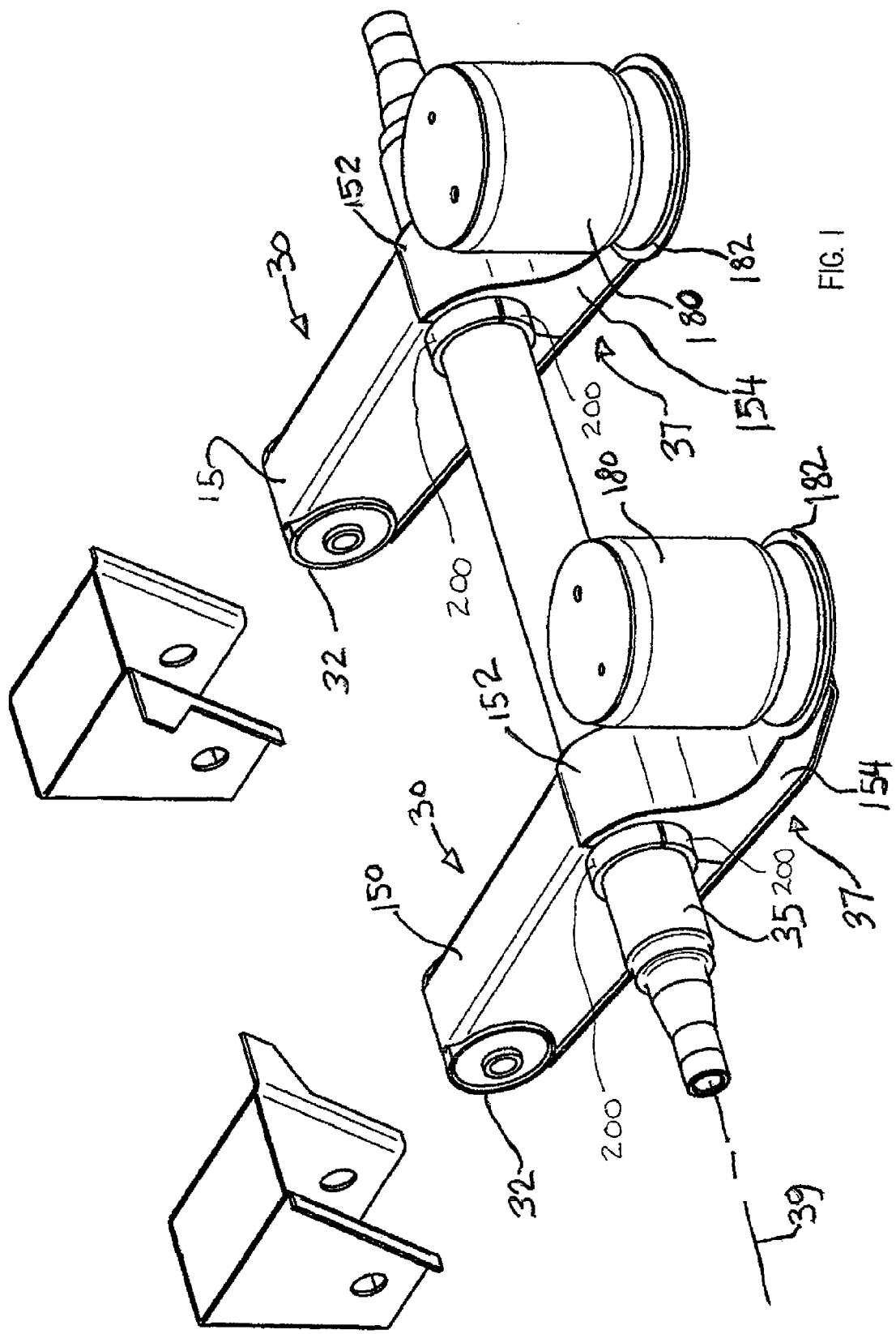
FIG. 1 is a perspective view of a trailing beam arrangement according to the present invention.
Figure 2:
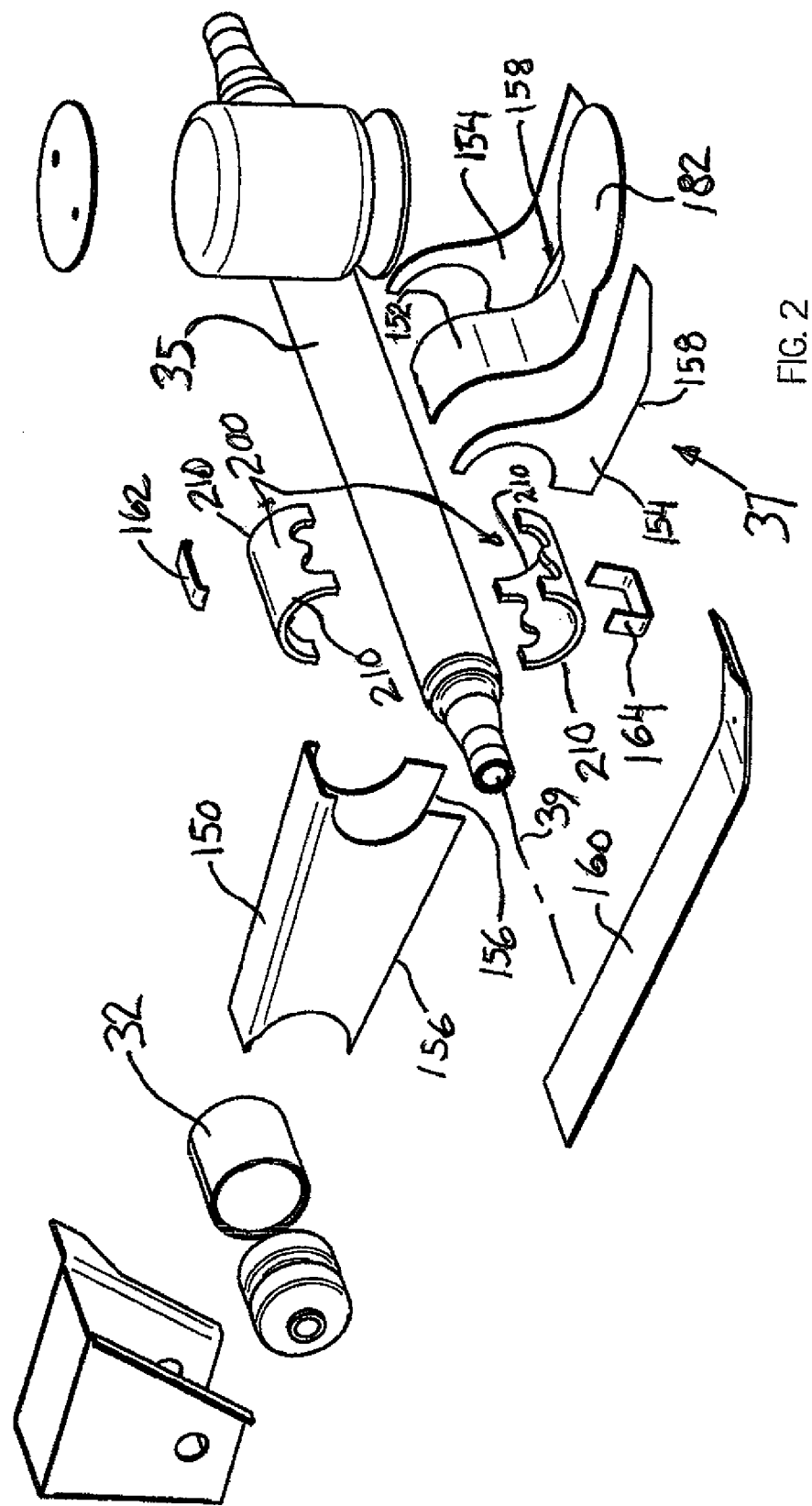
FIG. 2 is an exploded view of the trailing beam arrangement of FIG. 1.

A trailing beam according to the present invention is generally identified by reference 30. The trailing beam 30 illustrated has a unitary structure welded together from sections and welded to an axle wrap 200. The trailing beam 30 comprises an inverted channel shaped forward member 150 extending between the leading end 32 (a cylindrical member) and the axle 35.

A trailing end 37 of the trailing beam 30 is made up of an upper plate 152 for supporting a resilient member such as an air bag or "spring" 180, and side plates 154 depending downwardly from the upper plate 152. The side plates 154 would typically be welded to the upper plate 152. The trailing end 37 extends rearwardly from the axle 35. The upper plate 152 terminates in a pad 182 which abuts against a resilient suspension member such as the air "spring" 180.

A bottom plate 160 extending from the leading end 32 to the trailing end 37 of the trailing beam 30 closes an underside of the trailing beam 30. The bottom plate 160 would be welded to lower edges 156 of the forward member 150 and to lower edges 158 of the side plates 154.

Gusset plates 162 and 164 may be used at the juncture of the forward member 150 and the trailing end 37 to reinforce weld joints therebetween. A mounting plate (not shown) may be welded to the forward member 150 to support a shock absorber mounting assembly (not shown).

Figure 3:
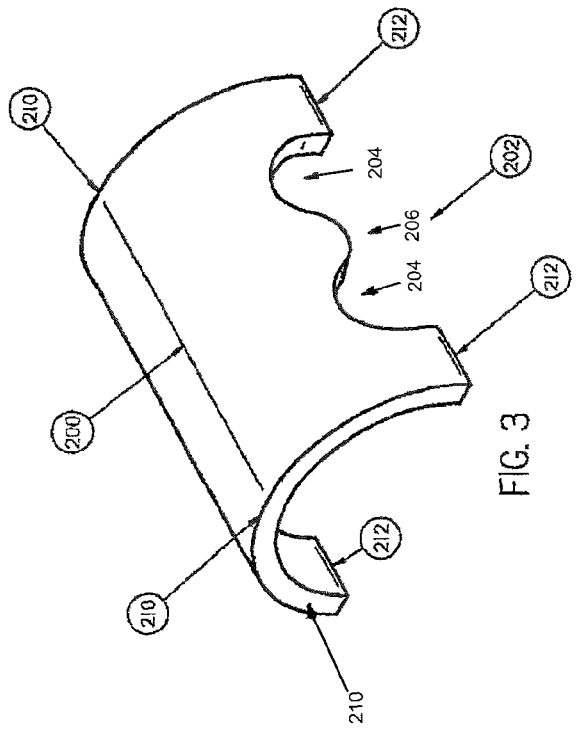
FIG. 3 is a perspective view of an axle wrap according to the present invention.
Figure 6:
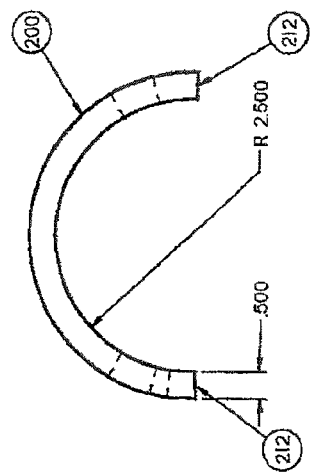
FIG. 6 is an end elevation of the axle wrap of FIG. 1.
Figure 4:
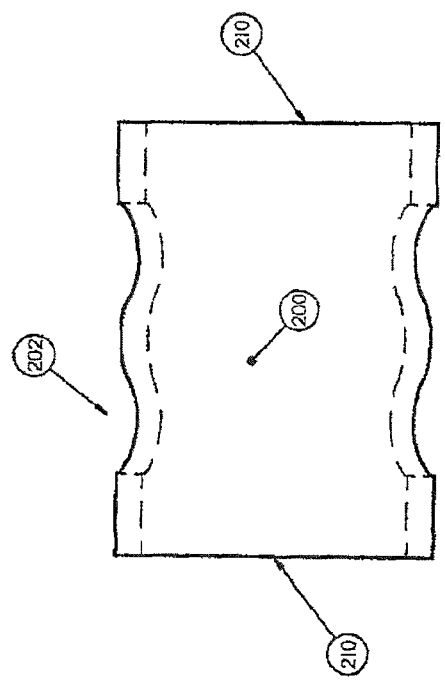
FIG. 4 is a top plan view of the axle wrap of FIG. 1.
Figure 5:
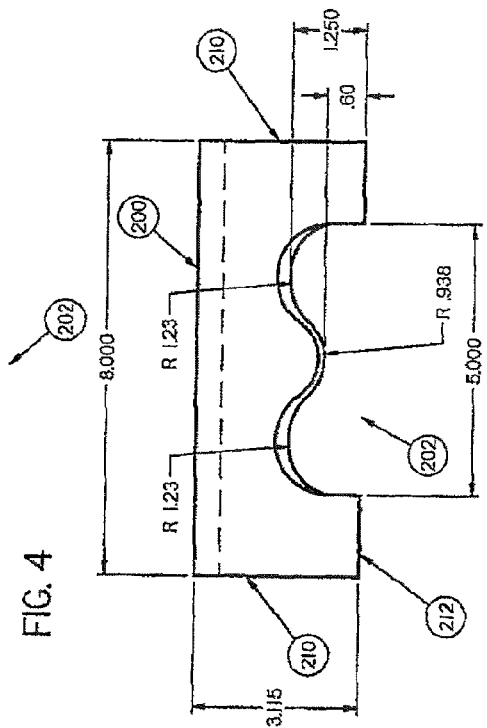
FIG. 5 is a front elevation of the axle wrap of FIG. 1.
Figure 7:
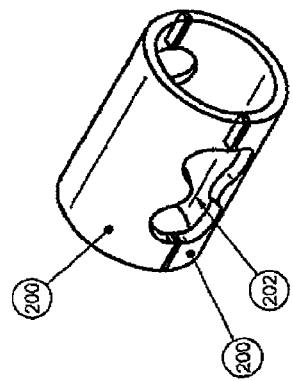
FIG. 7 is a perspective view illustrating how a pair of axle wraps according to the present invention would join.
Figure 10:
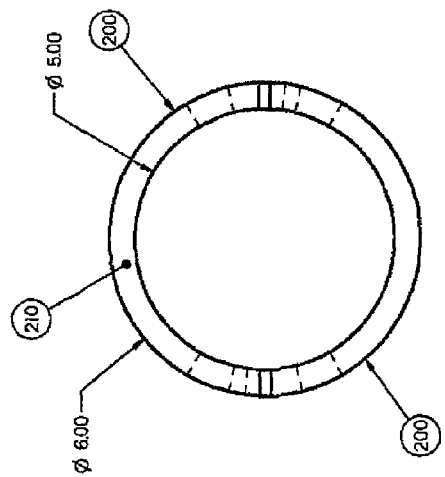
FIG. 10 is an end elevation corresponding to FIG. 5.
Figure 8:
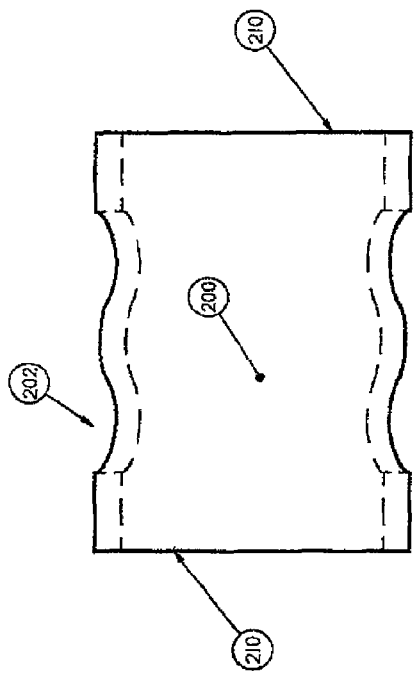
FIG. 8 is a top plan view corresponding to FIG. 5.
Figure 9:
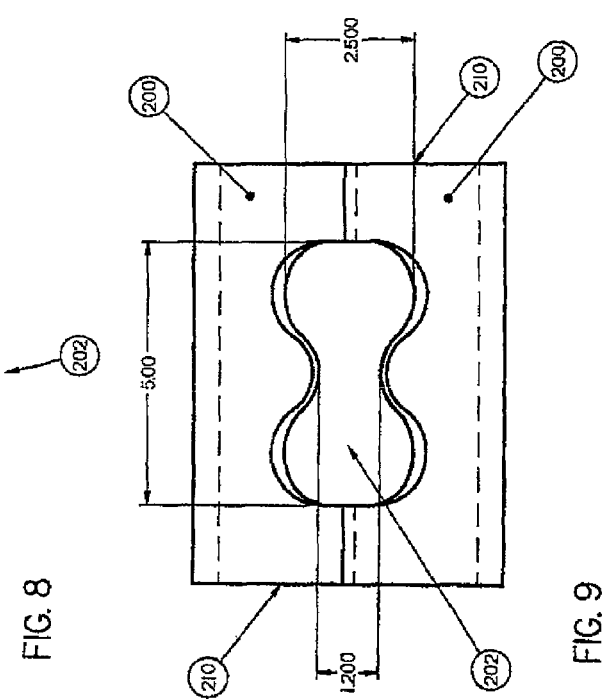
FIG. 9 is a front elevation corresponding to FIG. 5.

A pair of axle wraps 200 surround the axle 35. The axle wraps 200 form opposite sides of a tube which surrounds the axle 35. Windows 202 are provided in the axle wraps 200 about a perimeter of which the axle wraps 200 may be welded to the axle 35. Notably the windows 202 are of a curved configuration, lacking any significant horizontally extending aspect (i.e. parallel to an axis 39 of the axle 35). This is significant as it avoids having any appreciable portion of the weld between the axle wraps 200 and the axle 35 extending along a grain of the axle 35 which would typically, due to axle forming techniques, run parallel to the axis 39 of the axle 35. This avoids a possibility of cracks in the axle 35 arising from weld stresses across the grain. As shown in FIGS. 2 through 10, the curved sided indentations 202 have spaced apart concave regions 204 (FIG. 3) joined by a convex region 206 (FIG. 3).

Opposite ends 210 of the wraps 200 would also be welded to the axle 35 radially thereabout. The wraps 200 would be welded together at side edges 212 extending between the windows 202 and the opposite ends 210. The wraps would be welded to the trailing beam 30 inboard of the opposite ends 210 and the windows 202.

The wraps 200 would typically have a 2.5 inch inside radius, a wall thickness of about 0.5 inches and a length of about 8 inches. The center tube 52 of the bushing 50 would typically have an inside diameter of 1.5 inches, a wall thickness of about 0.375 inches and a length of about 6.75 inches.

The above description has been described by way of example. It will be apparent to persons skilled in the art that a number of variations and modifications may be made without departing from the scope of the invention as defined in the claims.

The invention claimed is:

1. A trailing beam for supporting an axle comprising:
   an inverted channel shaped forward member extending longitudinally between and transverse to a tubular leading end which receives a pivot mounting bushing, the axle having an axle axis that is parallel to a mounting axis of said leading end;
   a trailing end extending longitudinally from said forward member transverse to said axle axis, said trailing end having a top plate and opposite sides welded along adjacent edges, said top plate terminating in a pad for abutting against a resilient suspension member;
   said forward member and trailing end being welded one to the other at a juncture above and below said axle;
   a bottom plate extending from said leading end along the length of said forward member and said side plates and being welded to respective lower edges thereof;
   an axle wrap comprising a pair of semi-tubular members for encircling said axle, said members having opposite ends with opposite side edges extending therebetween and a curved sided indentation extending into said opposite side edges to provide a window for weld securement of said axle wrap to said axle without said weld extending parallel to a longitudinal axis of said axle, said curved sided indentations having spaced apart concave regions joined by a convex region;
   said axle wraps being welded to each other along said side edges beyond said indentation;
   said opposite ends of said axle wraps being welded about respective recesses in said forward member and said plates which receive said axle.

2. The trailing beam of claim 1 further having gusset plates welded to said forward member and said trailing end at said juncture to reinforce said trailing beam at said juncture.

3. An axle wrap for a trailer axle, said axle wrap comprising:
   a pair of semi-tubular members for encircling said axle, said members having opposite ends with opposite side edges extending therebetween; and
   a curved sided indentation extending into said opposite side edges to provide a window for weld securement of said axle wrap to said axle without said weld extending parallel to a longitudinal axis of said axle, said curved sided indentations having spaced apart concave regions joined by a convex region.

4. An axle wrap for a trailer axle, the axle wrap comprising:
   a first semi-tubular member and a second semi-tubular member, which together form a tube configured to at least substantially surround the trailer axle, each one of the first and second semi-tubular members including:
   a first side and a second side opposite thereto, the first and second sides extending between a first end and a second end of each of the first and second semi-tubular members;
   a first pair of side edges extending along the first side, a first side edge of the first pair of side edges extending from the first end, and a second side edge of the first pair of side edges extending from the second end;
   a second pair of side edges extending along the second side, a first side edge of the second pair of side edges extending from the first end, and a second side edge of the second pair of side edges extending from the second end;
   a first curved sided indentation defined between the first pair of side edges;
   a second curved sided indentation defined between the second pair of side edges; and
   each one of the first and second curved sided indentations including a convex region between a pair of concave regions;
   a first window defined by the first curved sided indentation of each one of the first and second semi-tubular members when the first and second semi-tubular members are mounted to the axle; and
   a second window defined by the second curved sided indentation of each one of the first and second semi-tubular members when the first and second semi-tubular members are mounted to the axle;
   wherein each one of the first and second windows are configured to provide for weld securement of the axle wrap to the axle without the weld extending parallel to a longitudinal axis of the axle.

* * * * *